(12) United States Patent
Li

(10) Patent No.: US 8,767,621 B2
(45) Date of Patent: Jul. 1, 2014

(54) ACCESS METHOD AND SYSTEM FOR REVERSE PUBLIC CHANNEL IN WIRELESS NETWORK

(75) Inventor: Liangbin Li, Shenzhen (CN)

(73) Assignee: ZTE Corporation (CN)

( * ) Notice: Subject to any disclaimer, the term of this patent is extended or adjusted under 35 U.S.C. 154(b) by 462 days.

(21) Appl. No.: 13/144,163

(22) PCT Filed: Sep. 24, 2009

(86) PCT No.: PCT/CN2009/074202
§ 371 (c)(1),
(2), (4) Date: Jul. 12, 2011

(87) PCT Pub. No.: WO2010/083688
PCT Pub. Date: Jul. 29, 2010

(65) Prior Publication Data
US 2011/0268074 A1    Nov. 3, 2011

(30) Foreign Application Priority Data

Jan. 21, 2009  (CN) .......................... 2009 1 0008434

(51) Int. Cl.
*H04W 4/00* (2009.01)
*H04W 72/04* (2009.01)
*H04L 1/18* (2006.01)

(52) U.S. Cl.
CPC ......... *H04W 72/0406* (2013.01); *H04L 1/1819* (2013.01); *H04L 1/1809* (2013.01); *H04L 1/1816* (2013.01); *H04L 1/18* (2013.01); *H04L 1/1812* (2013.01)
USPC ............................. 370/328; 370/329; 370/330

(58) Field of Classification Search
None
See application file for complete search history.

(56) References Cited

U.S. PATENT DOCUMENTS

2008/0081651 A1    4/2008  Kuroda et al.
2008/0112351 A1*   5/2008  Surineni et al. ............... 370/312
(Continued)

FOREIGN PATENT DOCUMENTS

CN          1764100 A      4/2006
CN        101040557 A      9/2007
(Continued)

OTHER PUBLICATIONS

Author Unknown, Data Service Options for Spread Spectrum Systems, Third Generation Partnership Project 2, Document No. 3GPP2 C/S0017-0, version 5.0, Feb. 17, 2003, pp. 1-1 to 4-2.*
International Search Report for PCT/CN2009/074202, Completed by the Chinese Patent Office on Dec. 18, 2009, 4 pages including English Translation.

*Primary Examiner* — John Blanton
*Assistant Examiner* — Christopher Crutchfield
(74) *Attorney, Agent, or Firm* — Brooks Kushman P.C.

(57) ABSTRACT

A method and system for accessing a reverse common channel in a wireless network, said method comprises: according to burst data to be sent, a terminal sending a burst data request to a base station in said reverse common channel; according to captured said burst data request, said base station allocating resources to the burst data to be sent in said reverse common channel, and notifying allocated resources to said terminal through a forward common channel; and said terminal using said resources allocated by said base station to send said burst data to said base station in said reverse common channel according to a Hybrid Automatic Repeat Request (HARQ). The present invention can improve the access capacity of the reverse common channel and the rate of carrying the burst data in the reverse common channel, especially in the Do Rev. A system.

10 Claims, 2 Drawing Sheets

(56) References Cited

U.S. PATENT DOCUMENTS

2008/0151743 A1* 6/2008 Tong et al. .................... 370/204
2008/0301514 A1 12/2008 Ma et al.
2009/0016265 A1* 1/2009 Katayama et al. ............ 370/328

FOREIGN PATENT DOCUMENTS

| CN | 101505200 A | 8/2009 |
|---|---|---|
| WO | 2009008635 A1 | 1/2009 |

* cited by examiner

ACCESS METHOD AND SYSTEM FOR REVERSE PUBLIC CHANNEL IN WIRELESS NETWORK

CROSS-REFERENCE TO RELATED APPLICATION

This application is the U.S. national phase of PCT Application No. PCT/CN2009/074202 filed Sep. 24, 2009 which claims priority to Chinese Application No. 200910008434.5 filed Jan. 21, 2009, the disclosures of which are incorporated in their entirety by reference herein.

TECHNICAL FIELD

The present invention relates to the wireless network field, and specifically, to a method and system for accessing a reverse common channel in a wireless network.

BACKGROUND OF THE RELATED ART

The 3G and 4G have higher and higher requirements for rate and burst of high speed data service, and the most important feature of the high speed data service is the burstiness.

The Hybrid Automatic Repeat Request (HARQ) technique is one of error control techniques, and with the development of the wireless services, the HARQ plays a more and more important role in the wireless communication field. There are reasons in mainly two aspects: first, most wireless services in the future are uplink and downlink, asymmetry and burst packet data services, which don't have a high requirement for delay, but have a very high requirement for data quality in transmission. Second, the wireless propagation environment is especially complex, and the received signal not only has various fading and the Doppler shift caused by moving, but also is affected by various interferences and noises. These fading and interferences easily cause random errors and burst errors, which will severely affect the transmission quality. Combining the Forward Error Correction (FEC) and error detection plus Automatic Repeat Request (ARQ) forms the HARQ. Each sent data packet includes check bits of the error correction and error detection. If the number of error bits in the received packet is in the error correcting capability, the errors will be corrected automatically; when the errors are severe, and beyond the error correcting capability of the FEC, the sending end should retransmit. This mode reduces the decoding complexity of the FEC mode to a certain extent, and avoids the drawback of the bad information transmission coherence of the ARQ mode. Briefly, the HARQ can improve the system performance greatly, and flexibly adjust the rate of valid code element, and also solve the bit error problem caused by adopting the link adaptation, and be suitable for applying in the transmission of large data packets.

There are currently many methods for accessing a reverse common channel in the wireless network, such as the random ALOHA access mode, the slot ALOHA mode, and so on, and at present, these methods are more suitable for sending shorter burst data.

For the access requirement of the reverse common channel in wireless high speed data network, not only higher and higher burst data should be carried, for example some burst data with large amount of data (such as pictures, multimedia burst short messages and so on), but also transmission is carried out in the common channel in the burst ways as much as possible, and the dedicated channel is not used to carry out the transmission as much as possible to save the resources of the reverse dedicated channel and reduce the transmission delay of the burst data. However most of the current methods which are put forward for accessing the reverse common channel are unable to carry multiple users random high speed burst data, and reverse performance of the network is affected greatly, and more interference is caused, for example, in the Do Rev. A system, the maximum rate of reverse burst data is only 38.4 kbps.

SUMMARY OF THE INVENTION

The technique problem to be solved in the present invention is to provide a method and system for accessing a reverse common channel in a wireless network, which improves the access capacity of the reverse common channel and the rate of the burst data carried in the reverse common channel.

In order to achieve the above purpose, the present invention provides a method for accessing a reverse common channel in a wireless network, and the method comprises:

according to burst data to be sent, a terminal sending a burst data request to a base station in said reverse common channel;

according to captured said burst data request, said base station allocating resources to the burst data to be sent in said reverse common channel, and notifying allocated resources to said terminal through a forward common channel; and said terminal using said resources allocated by said base station to send said burst data to said base station in said reverse common channel in accordance with a Hybrid Automatic Repeat Request (HARQ).

The method of the present invention further comprises:

said base station using the HARQ to demodulate said burst data sent through said reverse common channel, and returning a confirmation message to said terminal through a forward acknowledgement channel; and according to said confirmation message returned by the forward acknowledgement channel, said terminal judging whether the terminal is required to continue using said resources allocated by said base station to send said burst data to said base station in said reverse common channel in accordance with said HARQ.

Furthermore, wherein, said reverse common channel comprises: a first common subchannel and a second common subchannel; said first common subchannel is used for said terminal sending said burst data request to said base station, and said second common subchannel is used for said terminal sending said burst data to said base station by using said resources allocated by said base station in said reverse common channel according to the HARQ; and said burst data request comprises: address information of said terminal, a length of the burst data which is requested to be sent, and delay requirement parameters of the burst data which is requested to be sent.

Furthermore, wherein, before the step of according to burst data to be sent, the terminal sending the burst data request to the base station in said reverse common channel, said method further comprises:

said terminal using one "threshold parameter of the burst data which is requested to be sent" to judge whether said burst data that said terminal requests to be sent is able to be sent to said base station through said first common subchannel directly.

Furthermore, wherein, the step of according to captured said burst data request, said base station allocating resources to the burst data to be sent in said reverse common channel, and notifying allocated resources to said terminal through a forward common channel comprises:

a cell busy and idle detecting unit in an allocator in said base station detecting a cell reverse load value in real time, and according to obtained said cell reverse load value, comparing with an overload threshold to obtain a ratio of power of an access channel data part to power of a reverse pilot part in a slot in said second common subchannel, and according to this ratio, obtaining a transmission rate used in said second common subchannel; and then according to this transmission rate and the length of the burst data which is requested to be sent included in said burst data request, calculating the number of access channel data frames required by said burst data; and then according to the number of said access channel data frames and a deadline of delay requirement parameters of the burst data which is requested to be sent in said burst data request, obtaining a slot resource arrangement format in each said access channel data frame carrying said burst data;

at the same time, said allocator in said base station obtaining a power adjusting value between slots in said access channel data frame by a working frequency band of said base station and said delay requirement parameters of the burst data which is requested to be sent included in said burst data request;

said allocator in said base station arranging obtained "transmission rate used in said second common subchannel", "slot resource arrangement format in each said access channel data frame carrying said burst data" and "power adjusting value between slots in said access channel data frame" into a confirmation message of said burst data request, and sending the confirmation message of the burst data request to said terminal through said forward common channel according to "address information of said terminal" included in said burst data request.

In order to achieve the above purpose, the present invention also provides a terminal for supporting for accessing a reverse common channel in a wireless network, which is configured to:

according to burst data to be sent, send a burst data request to a base station in said reverse common channel; and use resources allocated by said base station to send said burst data to said base station in said reverse common channel according to a Hybrid Automatic Repeat Request (HARQ), wherein said resources are allocated by said base station to the burst data to be sent in said reverse common channel according to captured said burst data request, and are notified to said terminal through a forward common channel.

Furthermore, the terminal can comprise: a sending burst data request module and a sending burst data module, wherein said sending burst data request module is configured to: according to the burst data to be sent, send the burst data request in said reverse common channel to an allocating module of said base station, and receive notified resources allocated by said allocating module to the burst data to be sent through the forward common channel according to captured said burst data request in the reverse common channel, and forward the resources to said sending burst data module; and said sending burst data module is configured to: receive and use allocated said resources to send said burst data to said base station in said reverse common channel according to said HARQ.

In the terminal of the present invention, wherein, said sending burst data module is further configured to: according to a confirmation message returned by a forward acknowledgement channel, judge whether to need to continue using said resources allocated by the allocating module of said base station to send said burst data to a receiving and demodulating module of said base station in said reverse common channel in accordance with said HARQ;

the confirmation message returned by said forward acknowledgement channel is the confirmation message that the receiving and demodulating module of said base station uses the HARQ to demodulate said burst data sent by said sending burst data module through said reverse common channel, and returns to said sending burst data module through the forward acknowledgement channel.

Furthermore, wherein, said reverse common channel between said terminal and base station comprises: a first common subchannel and a second common subchannel; said first common subchannel is used for said sending burst data request module sending said burst data request to said base station , and said second common subchannel is used for the sending burst data request module of said terminal sending said burst data to said base station by using said resources allocated by said base station in said reverse common channel according to the HARQ; and said burst data request comprises: address information of said terminal, a length of the burst data which is requested to be sent and delay requirement parameters of the burst data which is requested to be sent.

Furthermore, wherein, said terminal can further comprise:

a judging module, which is configured to use a "threshold parameter of the burst data which is requested to be sent" to judge whether said burst data that said terminal requests to be sent is able to be sent to said base station through said first common subchannel directly.

In order to achieve the above purpose, the present invention also provides a base station for supporting for accessing a reverse common channel in a wireless network, which is configured to:

according to a captured burst data request, allocate resources to the burst data to be sent in said reverse common channel, and notify allocated resources to a terminal through a forward common channel; wherein said burst data request is sent to said base station by said terminal in said reverse common channel according to burst data to be sent;

thereby said terminal is able to use said resources allocated by said base station to send said burst data to said base station in said reverse common channel according to a Hybrid Automatic Repeat Request (HARQ).

Furthermore, the base station can comprise an allocating module, and said allocating module is configured to:

according to said burst data request captured in said reverse common channel, allocate resources to the burst data to be sent, and notify allocated resources to a sending burst data request module of said terminal through the forward common channel, wherein said burst data request is sent to said allocating module by said sending burst data request module in said reverse common channel according to the burst data to be sent;

thereby said sending burst data module of said terminal is able to receive said resources forwarded by said sending burst data request module, and use allocated said resources to send said burst data to said base station in said reverse common channel according to said HARQ.

Furthermore, the base station can further comprise:

a receiving and demodulating module, which is configured to use said HARQ to demodulate said burst data sent by said sending burst data module through said reverse common channel, and return a confirmation message to the sending burst data module of said terminal through the forward acknowledgement channel, to make said sending burst data module judge whether to need to continue using said resources allocated by the allocating module of said base station to send said burst data to the receiving and demodulating module of said base station in said reverse common channel in accordance with said HARQ according to said confirmation message returned by the forward acknowledgement channel.

Said allocating module of said base station comprises: a detecting and calculating cell reverse load unit, a calculating transmission rate unit, a calculating access channel data frame number unit, a slot resources arrangement format unit, a calculating power adjusting value between slots unit and a sending configuration content unit; wherein, said detecting and calculating cell reverse load unit is configured to detect a cell reverse load value in real time, and according to obtained said cell reverse load value, compare with an overload threshold to obtain a ratio of power of an access channel data part to a power of a reverse pilot part in a slot in a second common subchannel, and send this ratio to said calculating transmission rate unit;

said calculating transmission rate unit is configured to according to received said ratio, obtain a transmission rate used in said second common subchannel, and send this transmission rate to said calculating access channel data frame number unit and sending configuration content unit;

said calculating access channel data frame number unit is configured to according to received said transmission rate and a length of the burst data which is requested to be sent included in said burst data request, calculate the number of an access channel data frame required by said burst data, and send this number to said slot resources arrangement format unit;

said slot resources arrangement format unit is configured to according to the number of received said access channel data frame and a deadline in delay requirement parameters of the burst data which is requested to be sent in said burst data request, obtain a slot resource arrangement format in each said access channel data frame carrying said burst data, and send said slot resource arrangement format to said sending configuration content unit;

said calculating power adjusting value between slots unit is configured to obtain a power adjusting value between slots in said access channel data frame by a working frequency band of said base station and the delay requirement parameters of the burst data which is requested to be sent included in said burst data request, and send said power adjusting value to said sending configuration content unit;

said sending configuration content unit is configured to receive said "transmission rate used in said second common subchannel", "slot resource arrangement format in each said access channel data frame carrying said burst data" and "power adjusting value between slots in said access channel data frame", and arrange into said burst data request confirmation message, and send this burst data request confirmation message to the sending burst data request module of said terminal through said forward common channel according to "address information of said terminal" included in said burst data request;

wherein said reverse common channel between said terminal and base station comprises: a first common subchannel and a second common subchannel; said first common subchannel is used for the sending burst data request module of said terminal sending said burst data request to said base station, and said second common subchannel is used for the sending burst data request module of said terminal sending said burst data to said base station by using said resources allocated by said base station in said reverse common channel according to the HARQ; and said burst data request comprises: address information of said terminal, a length of the burst data which is requested to be sent and delay requirement parameters of the burst data which is requested to be sent.

In order to achieve the above purpose, the present invention also provides a system for accessing a reverse common channel in a wireless network, which comprises the above terminal and the above base station.

Comparing with the prior art, the present invention adopts that the reverse common channel is divided into two subchannels for sending requests and burst data respectively, and at the same time when burst data is sent, the HARQ technique is used, and the present invention improves the access capacity of the reverse common channel and the speed of the burst data carried in the reverse common channel by using the above method, especially in the Do Rev. A system.

PREFERRED EMBODIMENTS OF THE PRESENT INVENTION

Below it will describe specific embodiments in detail, but not as a limitation of the present invention.

Figure 1:
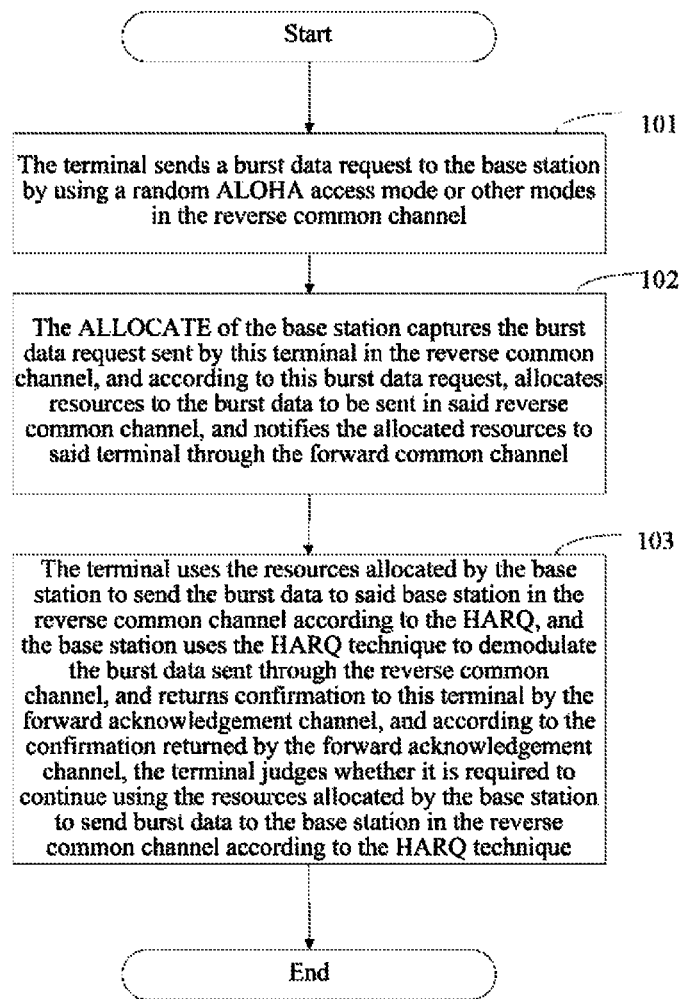
FIG. 1 is a flow chart of said method for accessing a reverse common channel in a wireless network according to the example of the present invention.

As shown in FIG. 1, the method for accessing a reverse common channel in a wireless network according to the example of the present invention is mainly applied in a case that a terminal is required to send burst data (the burst data can be the information such as the connection setup request message or pictures and so on) in the reverse common channel to a base station, and specific steps comprise:

Step 101, the terminal sends a burst data request (AccessBRequest) to the base station by using a random ALOHA access mode or other modes in the reverse common channel.

Figure 3:
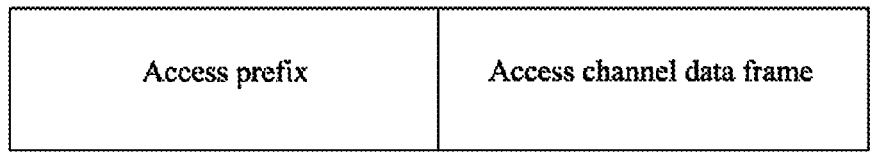
FIG. 3 is a structure diagram of the composition of the access probe in the common subchannel A.

Besides, after sending the burst data request, the terminal can use the stop-and-wait protocol to wait for a burst data request confirmation (AccessBRequestRespone) message sent by the base station through a forward common channel;

In an example, the reverse common channel between the terminal (AT) and the base station is divided into two common subchannels in logical function: a first common subchannel and a second common subchannel, and in the examples of the present invention, the first common subchannel is denoted as the common subchannel A, and the second common subchannel is denoted as the common subchannel B (in the implementation, the common subchannel A and the common subchannel B can be implemented in one channel, or implemented respectively by dividing into two channels); the terminal uses the random ALOHA access mode or other modes to send the burst data request (AccessBRequest) to the base station in the common subchannel A;

Wherein the burst data request comprises: the address information of the terminal, the length of the burst data which is requested to be sent (LengthAccessMsg) and delay requirement parameters of the burst data which is requested to be sent (DelayAccessMsg);

wherein, the burst data request is very small, thus the common subchannel A uses the random ALOHA access mode or other modes to send the burst data request by an access probe, and one access probe is composed of an access prefix and an access channel data frame (as shown in FIG. 3), and the access prefix is used for assisting the capture and demodulation of the base station, which is composed of the reverse pilot, and when the common subchannel A uses the access probe to send the burst data request, the value of the power of reverse pilot of the access prefix in the access probe is obtained by using a step increasing method, and the access channel data frame in the access probe is used for carrying the burst data request, and the access channel data frame is designed to be very short, for example designed to be about 6.66 ms, to ensure the base station can complete the capture and demodulate the burst data request as soon as possible in subsequent steps, and in the Do Rev. A system, the access channel data frame in the access probe is designed to be 26.6 ms.

Besides, before the step 101, the terminal also can compare the configured "threshold parameters of judging burst data which is requested to be sent (ThresholdAccessB)" with burst data to judge whether the burst data that the terminal requests to be sent is directly sent to said base station by the first common subchannel;

wherein this ThresholdAccessB parameter includes the burst data length threshold (LengthThresholdAccessB) and burst data delay threshold (DelayThresholdAccessB), and herein the threshold parameter ThresholdAccessB can be configured during the negotiation between the terminal and the access network (AN), and also can be sent by each cell to the terminal through the forward common channel to carry out the configuration; when the terminal is required to send burst data in the reverse common channel to the base station, the terminal carries out the judgment on the length of the burst data which is requested to be sent and delay requirement parameter of the burst data which is requested to be sent, and if the following two conditions are satisfied at the same time, then the terminal generates the burst data request and sends the burst data request to the allocator of the base station in the common subchannel A, otherwise the terminal sends the burst data directly to the base station in the common subchannel A;

Said two conditions are:
1. the length of the burst data which is requested to be sent is greater than the burst data length threshold;
2. the delay requirement parameter of the burst data which is requested to be sent is greater than the burst data delay threshold.

Step 102, the burst data request allocator of the base station (allocator for short, ALLOCATE) captures the burst data request sent by this terminal in the reverse common channel, and according to this burst data request, allocates resources to the burst data to be sent in said reverse common channel, and notifies the allocated resources to said terminal through the forward common channel.

Figure 4:
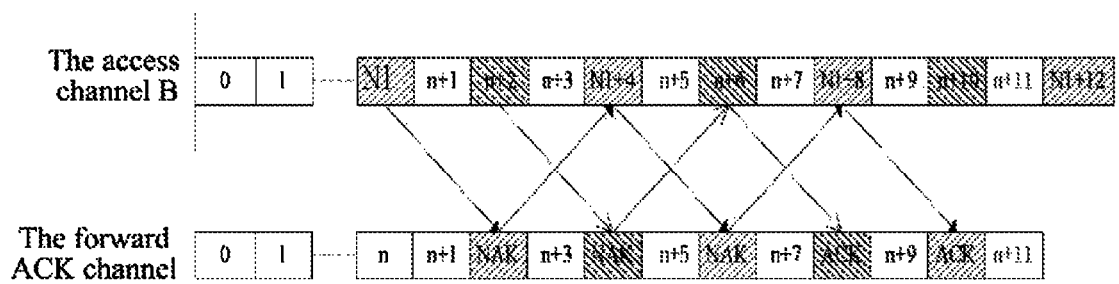
FIG. 4 is a flow chart of carrying out the burst data transmission between the terminal and base station through the common subchannel B and the forward ACK channel.

In an example, the step 102 specifically comprises the steps:
1. the base station successfully captures the burst data request sent by this terminal in the common subchannel A, and sends the burst data request to the ALLOCATE of the base station;

what should be described further is the access channel data frame for carrying the burst data in the common subchannel B is divided in the time axis by using the time division mechanism, for example divided into G Slots, and every two Slots are at intervals of D Slots, and the values of G and D are configured according to the wireless channel fading characteristics, system process capability and forward and reverse link delay (the forward and reverse link delay refers to the summation of the forward link delay and the reverse link delay), and each Slot is composed of a reverse pilot part and an access channel data part, and the power of the Slot is equal to the summation of the power of the reverse pilot part and the power of the access channel data part, and for example, the slot(m) is the $m^{th}$ Slot counted from the $0^{th}$ Slot, and the Slot length can be configured according to the wireless channel fading characteristics, for example, the Slot length is configured to be 6.66 ms; as shown in FIG. 4, the example of the present invention configures the G to be 4 Slots (namely N1, N1+4, N1+8, and N1+12), and D is configured to be 3 Slots (namely n+1, n+2, and n+3 between N1 and N1+4), and each Slot is composed of a reverse pilot part and an access channel data part, and the power of each Slot is equal to the summation of the power of the reverse pilot part and the power of the access channel data part.

2. the cell busy and idle detecting unit in the ALLOCATE detects the size of the cell reverse load in real time, and the ALLOCATE compares the obtained cell reverse load with the overload threshold to obtain the ratio of the power of the access channel data part to the power of the reverse pilot part of the slot in the common subchannel B (D2P);

In this example, specifically, if the value of the cell reverse load reaches to or exceeds the overload threshold, D2P (the ratio of the power of the access channel data part to the power of the reverse pilot part of the slot) obtained by the ALLOCATE in the common subchannel B is the first ratio D2PAccessBBusy; if the value of the cell reverse load is less than the overload threshold, D2P obtained by the ALLOCATE in the common subchannel B is the second ratio D2PAccessBIdle;

wherein when the cell busy and idle detecting unit in the ALLOCATE detects the cell reverse load is overloaded, for avoiding causing impact on the reverse load during sending the burst data in the common subchannel B, the ALLOCATE should allocate a smaller D2P, and thus the first ratio D2PAccessBBusy should be less than the second ratio D2PAccessBIdle;

the example of the present invention only gives 2 detection judgment conditions to obtain the D2P values in the common subchannel B, But the present invention is not limited to above 2 detection judgment conditions and corresponding D2P values, and can also obtain other D2P values by other judgment conditions, and all these D2P values corresponds to levels of transmission rate used in the common subchannel B.

3. it is assumed that the levels of transmission rate L of sending the burst data in the common subchannel B include [Rate1, Rate2, Rate3, . . . , RateY], namely there are Y levels of transmission rate, and the D2P which requires sending corresponding to each level of transmission rate is [D2Prate1, D2Prate2, . . . , D2PrateY], and frame length of each frame of the access channel data frame corresponding to each level of transmission rate is [FrameLengthRate1, FrameLengthRate2, . . . , FrameLengthRateY], and the ALLOCATE obtains the transmission rate L which can be used in the common subchannel B according to the obtained D2P value in the common subchannel B and the judgment conditions, and these judgment conditions are:

1) D2Prate(L)<=D2P;
2) Ppilot+D2Prate(L)<=the terminal maximum transmission power (the Ppilot is the power of the reverse pilot part during the terminal accessing included in the burst data request);
3) the $L+1^{th}$ transmission rate can not satisfy the conditions 1) and 2) at the same time;

4. according to the length of the burst data which is requested to be sent in the burst data request, the ALLOCATE calculates the number of required access channel data frames (NumFrameAccessB) when the burst data is sent according to the frame length of the access channel data frame corresponding to the allocated $L^{th}$ transmission rate, and the specific steps are: the length of the burst data which is required to be sent is divided by the frame length of each frame FrameLengthRate(L) of the access channel data frame corresponding to the level of the $L^{th}$ transmission rate, and if there is a remainder, then the obtained number is added by 1;

5. according to the calculated number of the access channel data frames, the deadline of the delay requirement parameters (DelayAccessMsg) of the burst data which is required to be sent in the burst data request and the configured division mechanism in the access channel data frame for bearing the burst data in the common subchannel B, the ALLOCATE obtains slot resource arrangement formats in NumFrameAccessBN (Num for short) access channel data frames for carrying burst data in the common subchannel B, and the slot resource arrangement formats are specifically denoted as:

the slot resource arrangement format in the first access channel data frame:

[Slot(N1), Slot(N1+D), Slot(N1+2D), Slot(N1+3D)]

the slot resource arrangement format in the second access channel data frame:

[Slot(N2), Slot(N2+D), Slot(N+2D), Slot(N2+3D)]

. . .

the slot resource arrangement format in the NumFrameAccessB$^{th}$ access channel data frame:

[Slot(NumFrameAccessBN), Slot(NumFrameAccessBN+D), Slot(NumFrameAccessBN +2D), Slot(NumFrameAccessBN+3D)]

wherein N1, N2, . . . , NumFrameAccessBN are the sequence numbers of the first slot in each access channel data frame.

6. the ALLOCATE determines the power adjusting value (Padjust) between slots in each access channel data frame according to the working frequency band of the base station and the delay requirement parameters (DelayAccessMsg) of the burst data which is requested to be sent included in the burst data request, for example configured to be 0.5 dB; besides, this step 6 can be before or after steps 2-5, and there is not a certain sequence herein.

7. the ALLOCATE arranges the obtained "transmission rate L of sending this burst data in the common subchannel B", "the slot resource arrangement formats in the Num access channel data frames carrying this burst data" and "the power adjusting value (Padjust) between slots in the Num access channel data frames" into the burst data request confirmation message, and sends this burst data request confirmation message to this terminal by the forward common channel according to the address information of the terminal included in the burst data request.

Step 103, the terminal uses the resources allocated by the base station to send the burst data to said base station in the reverse common channel according to the Hybrid Automatic Repeat Request (HARQ), and the base station uses the HARQ technique to demodulate the burst data sent through the reverse common channel, and returns confirmation to this terminal by the forward acknowledgement (ACK) channel, and according to the confirmation returned by the forward ACK channel, the terminal judges whether it is required to continue using the resources allocated by the base station to send burst data to the base station in the reverse common channel according to the HARQ technique.

In one example, the step 103 specifically comprises the steps:

1. the terminal monitors the burst data request confimation message sent from the forward common channel by the base station in real time, and when receiving this burst data request confimation message, record the power of the reverse pilot part (Ppilot) used during this terminal sending the burst data request through the common subchannel A at the last time;

2. according to "the slot resource arrangement formats in the Num access channel data frames carrying this burst data" included in the burst data request confirmation message, the terminal firstly allocates the burst data to be sent to the first slots in the Num access channel data frames, and uses the "transmission rate L of sending this burst data in the common subchannel B" included in the burst data request confirmation message to send access channel data frames to the base station for the first slots in the Num access channel data frames according to the HARQ technique (each access channel data frame uses separated HARQ technique), and the base station uses the HARQ technique to demodulate the data carried in the first slots in Num access channel data frames which carry the sent burst data in the common subchannel B, and if the data carried in the first slot in a certain access channel data frame in the Num access channel data frames is demodulated successfully, the ACK confirmation is sent in the forward ACK channel between the base station and the terminal to this terminal; if the data carried in the first slot in a certain access channel data frame is not demodulated successfully, the NAK (negative acknowledgement) confirmation is sent in the forward ACK channel to this terminal;

the terminal monitors the confirmation sent in the forward ACK channel, and if an ACK confirmation of a certain access channel data frame is received, it is considered that the base station successfully demodulates the data carried in the first slot in this access channel data frame, and stop sending this access channel data frame; if a NAK confirmation of a certain access channel data frame is received, then in the common subchannel B, the terminal continues using the HARQ technique to use the second slot of the access channel data frames to carry data and send the data to the base station through the common subchannel B (the power value of the reverse pilot part of the second slot has one more "power adjusting value between slots" included in the burst data request confimation message than the power value of the reverse pilot part of the former one slot), until the terminal uses up the left slots in this access channel data frame or receives the ACK confirmation in the forward ACK channel before using up the slots in this access channel data frame.

Herein the power adjusting value between slots (Padjust) could be positive or negative, and if positive, step is increased, and if negative, step is decreased;

besides, for the power of the reverse pilot part in the first slot in Num access channel data frames for carrying burst data sent in the common subchannel B, the terminal uses the power of the reverse pilot part (Ppilot) used during this terminal sending the burst data request by the common subchannel A at the last time, since this power is just the power which can be demodulated by the base station at present.

Regarding to the above step, it will take an example of an access channel data frame M below, and the slot resource arrangement format in this access channel data frame M is:

[Slot(M), Slot(M+D), Slot(M+2D), Slot(M+3D)]

Wherein each slot resource is composed of a reverse pilot part and an access channel data part, and the power of each slot resource is the summation of the power of the two parts, and the reverse pilot part uses the regular data to carry out the transmission, which is helpful to the base station carrying out the search and demodulation on the common subchannel B, and the power of the reverse pilot part is:

[Ppilot(M), Ppilot(M+D), Ppilot(M+2D), Ppilot(M+3D)]

The Ppilot(M) is equal to the power of the reverse pilot part (Ppilot) used during this terminal sending the burst data request by the common subchannel A at the last time;

herein the power value of the reverse pilot part of a certain slot in the access channel data frame M has one more power adjusting value (Padjust) than the power value of the reverse pilot part of the former one slot;

the power value of the access channel data part of each slot in the access channel data frame M is D2Prate[L] greater than the power value of the reverse pilot part of this slot;

After using the HARQ technique to send the first slot of this access channel data frame M, the terminal monitors the forward ACK channel, and if receiving the NAK confirmation sent by the base station, the terminal continues using the HARQ technique to use the left slots in this access channel data frame M to carry out the transmission, until the terminal uses up the left slots in this access channel data frame M or receives the ACK confirmation in the forward ACK channel before using up the slots in this access channel data frame M.

Figure 2:
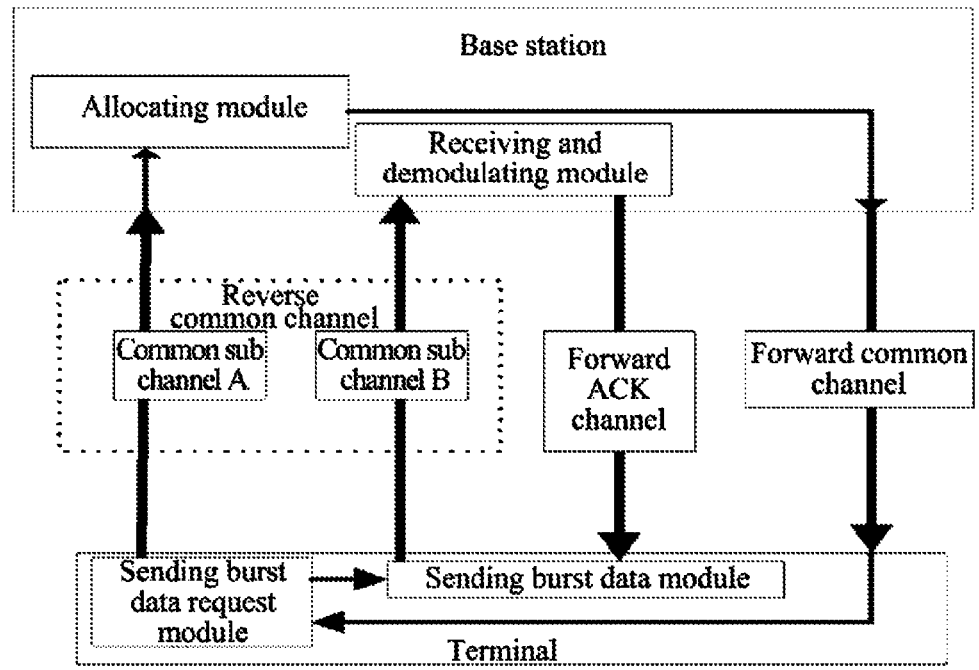
FIG. 2 is a structure schematic diagram of the system for accessing a reverse common channel in a wireless network according to the example of the present invention.

FIG. 2 shows the system for accessing a reverse common channel in a wireless network according to the example of the present invention, and this system comprises: a base station and a terminal, and the terminal comprises a sending burst data request module and a sending burst data module, and the base station comprises an allocating module and a receiving and demodulating module; wherein, the sending burst data request module is used for using the random ALOHA access mode or other modes to send burst data request to the allocating module in the base station through a reverse common channel between the base station and the terminal, and receiving the resources allocated to the burst data to be sent notified by the "allocating module" through a forward common channel and forwards to the "sending burst data module".

Wherein the sending burst data module uses the random ALOHA access mode or other modes to send the burst data request to the allocating module in the base station through a common subchannel A in the reverse common channel between the base station and the terminal.

Besides, after sending the burst data request, the "sending burst data request module" can use stop-and-wait protocol to wait for receiving a burst data request confirmation message sent by the "allocating module" through the forward channel.

Wherein the content included in the burst data request is the same with that of the burst data request in the method.

The allocating module is used for allocating resources for the burst data to be sent according to the burst data request captured in said reverse common channel, and notifying the allocated resources to the "sending burst data request module" of said terminal through the forward common channel.

The sending burst data module is used for receiving and using the allocated resources to send burst data to the receiving and demodulating module of the base station according to the HARQ in the reverse common channel, and receiving confirmation returned by the receiving and demodulating module through the forward acknowledgement channel, and used for judging whether it is required to continue using the resources allocated by the allocating module of the base station to send burst data according to the HARQ technique in the reverse common channel to the receiving and demodulating module of the base station.

The receiving and demodulating module is used for using the HARQ technique to demodulate the burst data sent by the sending burst data module through the reverse common channel, and returning confirmation to this sending burst data module through the forward acknowledgement channel.

Besides, the allocating module further comprises: a detecting and calculating cell reverse load unit, a calculating transmission rate unit, a calculating access channel data frame number unit, a slot resource arrangement format unit, a calculating power adjusting value between slots unit, and a sending configuration content unit; wherein, the detecting and calculating cell reverse load unit is used for detecting the cell reverse load value in real time, and comparing the obtained said cell reverse load with an overload threshold to obtain a ratio of the power of the access channel data part to the power of the reverse pilot part of the slots in the second common subchannel, and sending this ratio to the calculating transmission rate unit;

the calculating transmission rate unit is used for obtaining the transmission rate used in the second common subchannel according to the received ratio, and sending this transmission rate to the calculating access channel data frame number unit and sending configuration content unit;

the calculating access channel data frame number unit is used for calculating the number of access channel data frames required by the burst data according to received transmission rate and the length of the burst data which is requested to be sent included in the burst data request, and sending this number to the slot resource arrangement format unit;

the slot resource arrangement format unit is used for arranging formats for the slot resources in each said access channel data frame carrying the burst data according to the number of received access channel data frame and the deadline in the delay requirement parameters of the burst data which is requested to be sent in the burst data request, and sending to the sending configuration content unit;

the calculating power adjusting value between slots unit is used for obtaining the power adjusting value between slots in the access channel data frame according to the working frequency band of the base station and the delay requirement parameters of the burst data which is requested to be sent included in the burst data request;

the sending configuration content unit is used for receiving "the transmission rate used in said second common subchannel", "the slot resource arrangement format in each said access channel data frame carrying said burst data", and the power adjusting value between slots in the access channel data frame, and arranging into the burst data request confirmation message, and sending this burst data request confirmation message to the sending burst data request module of the terminal through the forward common channel according to "address information of said terminal" included in the burst data request.

Beside, the sending burst data module is further used for receiving the "burst data request confirmation message", and after receiving the "burst data request confirmation message", recording the power of the reverse pilot part (Ppilot) used during this terminal sending the burst data request through a common subchannel A in the reverse common channel at the last time; and then according to the "slot resource arrangement format in Num access channel data frames carrying this burst data" included in the "burst data request confirmation message", firstly allocating the burst data to be sent to the first slots in the Num access channel data frames, and for the first slots in the Num access channel data frames, according to the "transmission rate L of sending this burst data in the common subchannel B in the reverse common channel" included in the "burst data request confirmation message", using the HARQ technique (each access channel data frame uses the separated HARQ technique) to send to the receiving and demodulating module of the base station;

the receiving and demodulating module of the base station is further used for using the HARQ technique to demodulate the sent data carried in the first slot in Num access channel data frames carrying the burst data in the common subchannel B, and if the data carried in the first slot in a certain access channel data frame in the Num access channel data frames is demodulated successfully, then sending ACK confirmation to the sending burst data module of the terminal in the forward ACK channel between the receiving and demodulating module of the base station and the sending burst data module of the terminal; and if the data carried in the first slot in a certain access channel data frame is not demodulated successfully, then sending NAK confirmation to the sending burst data module of this terminal in the forward ACK channel;

the sending burst data module is further used for monitoring the confirmation sent in the forward ACK channel, and if an ACK confirmation of a certain access channel data frame is received, then considering that the receiving and demodulating module of the base station has successfully demodulated the data carried in the first slot in this access channel data frame, stopping sending this access channel data frame; if a NAK confirmation of a certain access channel data frame is received, then continuing using the HARQ technique in the common subchannel B to use the second slot in this access channel data frame to carry data and sending to the receiving and demodulating module of the base station (the power value of the reverse pilot part of this second slot has one more "the power adjusting value between slots" included in the burst data request confirmation message than the power value of the reverse pilot part of the former one slot), until this sending burst data module uses up the left slots in this access channel data frame or receives the ACK confirmation in the forward ACK channel before using up the left slots.

Said system in the example of the present invention can also comprises a judging module, which is configured in the terminal, the judging module is used for using a set of threshold parameters (ThresholdAccessB) of the burst data which is requested to be sent to judge whether the burst data that the terminal requests to be sent can be sent to the base station through the common subchannel A in the reverse common channel directly;

wherein these threshold parameters (ThresholdAccessB) include a burst data length threshold (LengthThresholdAccessB) and a burst data delay threshold (DelayThresholdAccessB); if the length of the burst data which is requested to be sent is greater than the burst data length threshold, and when delay requirement parameter of burst data which is requested to be sent is greater than the burst data delay threshold, the "sending burst data request module" uses the random ALOHA access mode or other modes in the common subchannel A to send the burst data request to the allocating module inside the base station, or the "sending burst data request module" directly sends this burst data to the base station in the common subchannel A.

Comparing with the prior art, the present invention uses that the reverse common channel is divided into two subchannels for sending requests and burst data respectively, and at the same time when burst data is sent, the HARQ technique is used, and the present invention improves the access capacity of the reverse common channel and the rate of carrying the burst data in the reverse common channel by using the above method, especially in the Do Rev. A system, which can further improves the access capacity of the reverse common channel and the stability of the reverse link capacity of the wireless communication system.

Certainly, the present invention can also have other various examples, and various corresponding modifications and transformations can be made according to the present invention by those skilled in the art without departing from the spirit or essence of the present invention, but these corresponding modifications and transformations should all fall into the protection scope of the appended claims in the present invention.

INDUSTRIAL APPLICABILITY

Comparing with the prior art, the present invention uses that the reverse common channel is divided into two subchannels for sending requests and burst data respectively, and at the same time when burst data is sent, the HARQ technique is used, and the present invention improves the access capacity of the reverse common channel and the rate of carrying the burst data in the reverse common channel by using the above method, especially in the Do Rev. A system.

What is claimed is:

1. A method for accessing a reverse common channel in a wireless network comprising:

according to burst data to be sent, a terminal sending a burst data request to a base station in said reverse common channel;

according to captured said burst data request, said base station allocating resources to the burst data to be sent in said reverse common channel, and notifying allocated resources to said terminal through a forward common channel; and said terminal using said resources allocated by said base station to send said burst data to said base station in said reverse common channel according to a Hybrid Automatic Repeat Request (HARQ), wherein:

said reverse common channel comprises: a first common subchannel and a second common subchannel; said first common subchannel is used for said terminal sending said burst data request to said base station, and said second common subchannel is used for said terminal sending said burst data to said base station by using said resources allocated by said base station in said reverse common channel according to the HARQ; and said burst data request comprises: address information of said terminal, a length of the burst data which is requested to be sent and delay requirement parameters of the burst data which is requested to be sent, and wherein:

the step of according to captured said burst data request, said base station allocating resources to the burst data to be sent in said reverse common channel, and notifying allocated resources to said terminal through the forward common channel comprises:

a cell busy and idle detecting unit in an allocator in said base station detecting a cell reverse load value in real time, and according to obtained said cell reverse load value, comparing with an overload threshold to obtain a ratio of power of an access channel data part to power of a reverse pilot part in a slot in said second common subchannel, and according to this ratio, obtaining a transmission rate used in said second common subchannel; and then according to this transmission rate and the length of the burst data which is requested to be sent included in said burst data request, calculating the number of access channel data frames required by said burst data; and then according to the number of said access channel data frames and a deadline of the delay requirement parameters of the burst data which is requested to be sent in said burst data request, obtaining a slot resource arrangement format in each said access channel data frame carrying said burst data;

at the same time, said allocator in said base station obtaining a power adjusting value between slots in said access channel data frame by a working frequency band of said base station and said delay requirement parameters of the burst data which is requested to be sent included in said burst data request;

said allocator in said base station arranging obtained "transmission rate used in said second common subchannel", "slot resource arrangement format in each said access channel data frame carrying said burst data" and "power adjusting value between slots in said access channel data frame" into a confirmation message of said burst data request, and sending the confirmation message of the burst data request to said terminal through said forward common channel according to the "address information of said terminal" included in said burst data request.

2. The method as claimed in claim 1, further comprising:
said base station using the HARQ to demodulate said burst data sent through said reverse common channel, and returning a confirmation message to said terminal through a forward acknowledgement channel; and
according to said confirmation message returned by the forward acknowledgement channel, said terminal judging whether to need to continue using said resources allocated by said base station to send said burst data to said base station in said reverse common channel according to said HARQ.

3. The method as claimed in claim 1 wherein, before the step of according to the burst data to be sent, the terminal sending the burst data request to the base station in said reverse common channel, said method further comprises:
said terminal using one "threshold parameter of the burst data which is requested to be sent" to judge whether said burst data that said terminal requests to be sent is able to be sent to said base station through said first common subchannel directly.

4. A system for accessing a reverse common channel in a wireless network comprising the terminal as claimed in claim 1 and a base station for supporting accessing a reverse common channel in a wireless network, which is configured to:
according to a captured burst data request, allocate resources to burst data to be sent in said reverse common channel, and notify allocated resources to a terminal through a forward common channel; wherein said burst data request is sent to said base station by said terminal in said reverse common channel according to the burst data to be sent,
and thereby said terminal is able to use said resources allocated by said base station to send said burst data to said base station in said reverse common channel according to a Hybrid Automatic Repeat Request (HARQ).

5. A system for accessing a reverse common channel in a wireless network comprising the terminal as claimed in claim 1 and a base station for supporting accessing a reverse common channel in a wireless network, which is configured to:
according to a captured burst data request, allocate resources to burst data to be sent in said reverse common channel, and notify allocated resources to a terminal through a forward common channel; wherein said burst data request is sent to said base station by said terminal in said reverse common channel according to the burst data to be sent,
and thereby said terminal is able to use said resources allocated by said base station to send said burst data to said base station in said reverse common channel according to a Hybrid Automatic Repeat Request (HARQ).

6. A system for accessing a reverse common channel in a wireless network comprising the terminal as claimed in claim 1 and a base station for supporting accessing a reverse common channel in a wireless network, which is configured to:
according to a captured burst data request, allocate resources to burst data to be sent in said reverse common channel, and notify allocated resources to a terminal through a forward common channel; wherein said burst data request is sent to said base station by said terminal in said reverse common channel according to the burst data to be sent,
and thereby said terminal is able to use said resources allocated by said base station to send said burst data to said base station in said reverse common channel according to a Hybrid Automatic Repeat Request (HARQ).

7. A system for accessing a reverse common channel in a wireless network comprising the terminal as claimed in claim 1 and a base station for supporting accessing a reverse common channel in a wireless network, which is configured to:
according to a captured burst data request, allocate resources to burst data to be sent in said reverse common channel, and notify allocated resources to a terminal through a forward common channel; wherein said burst data request is sent to said base station by said terminal in said reverse common channel according to the burst data to be sent,
and thereby said terminal is able to use said resources allocated by said base station to send said burst data to said base station in said reverse common channel according to a Hybrid Automatic Repeat Request (HARQ).

8. A system for accessing a reverse common channel in a wireless network comprising the terminal as claimed in claim 1 and a base station for supporting accessing a reverse common channel in a wireless network, which is configured to:
according to a captured burst data request, allocate resources to burst data to be sent in said reverse common channel, and notify allocated resources to a terminal through a forward common channel; wherein said burst data request is sent to said base station by said terminal in said reverse common channel according to the burst data to be sent,
and thereby said terminal is able to use said resources allocated by said base station to send said burst data to said base station in said reverse common channel according to a Hybrid Automatic Repeat Request (HARQ).

9. A base station for supporting for accessing a reverse common channel in a wireless network, which is configured to:
according to a captured burst data request, allocate resources to burst data to be sent in said reverse common channel, and notify allocated resources to a terminal through a forward common channel; wherein said burst data request is sent to said base station by said terminal in said reverse common channel according to the burst data to be sent,
and thereby said terminal is able to use said resources allocated by said base station to send said burst data to said base station in said reverse common channel according to a Hybrid Automatic Repeat Request (HARQ), wherein the base station is further configured to:
according to said burst data request captured in said reverse common channel, allocate resources to the burst data to be sent, and notify allocated resources to said terminal through the forward common channel, wherein said burst data request is sent to said terminal in said reverse common channel according to the burst data to be sent, and, thereby, said terminal is able to receive said allocated resources, and use said allocated resources to send said burst data to said base station in said reverse common channel according to said HARQ;

wherein the base station is further configured to:

detect a cell reverse load value in real time, and according to obtained said cell reverse load value, compare with an overload threshold to obtain a ratio of power of an access channel data part to power of a reverse pilot part in a slot in a second common subchannel;

according to said ratio, obtain a transmission rate used in said second common subchannel;

according to said transmission rate and a length of the burst data which is requested to be sent included in said burst data request, calculate the number of access channel data frames required by said burst data;

according to said number of access channel data frames and a deadline in delay requirement parameters of the burst data which is requested to be sent in said burst data request, obtain a slot resource arrangement format in each said access channel data frame carrying said burst data;

obtain a power adjusting value between slots in said access channel data frame by a working frequency band of said base station and the delay requirement parameters of the burst data which is requested to be sent included in said burst data request;

arrange said "transmission rate used in said second common subchannel", "slot resource arrangement format in each said access channel data frame carrying said burst data" and "power adjusting value between slots in said access channel data frame" into a confirmation message of said burst data request, and send the confirmation message of the burst data request to said terminal through said forward common channel according to "address information of said terminal" included in said burst data request;

and wherein said reverse common channel between said terminal and said base station comprises: a first common subchannel and a second common subchannel; said first common subchannel is used for said terminal sending said burst data request to said base station, and said second common subchannel is used for said terminal sending said burst data to said base station by using said resources allocated by said base station in said reverse common channel according to the HARQ, and said burst data request comprises: address information of said terminal, a length of the burst data which is requested to be sent and delay requirement parameters of the burst data which is requested to be sent.

10. The base station as claimed in claim 9, further configured to:

use said HARQ to demodulate said burst data sent by said terminal through said reverse common channel, and return a confirmation message to said terminal through a forward acknowledgement channel, to make said terminal judge whether to need to continue using said resources allocated by said base station to send said burst data to said base station in said reverse common channel according to said HARQ according to said confirmation message returned by the forward acknowledgement channel.

* * * * *